Jan. 9, 1951  C. J. CRETORS  2,537,744
CORN POPPING APPARATUS
Filed June 10, 1946  2 Sheets-Sheet 1
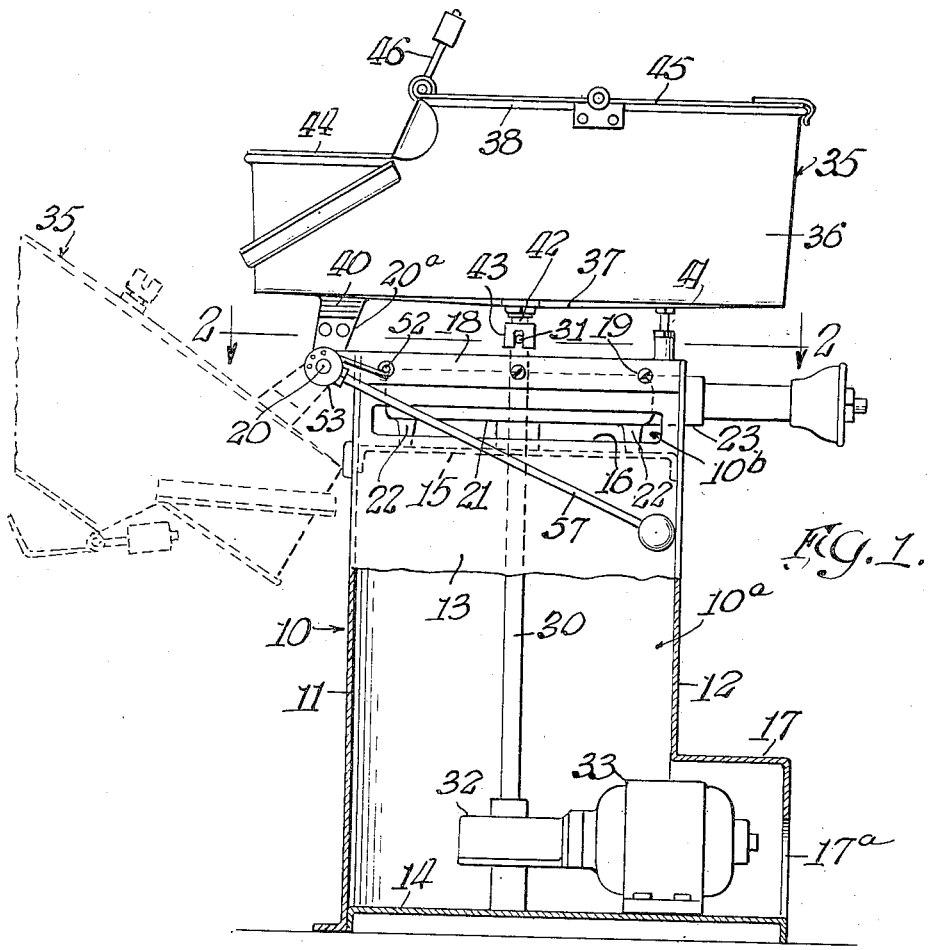
Inventor
Charles J. Cretors
by Arthur W. Anderson
Atty.

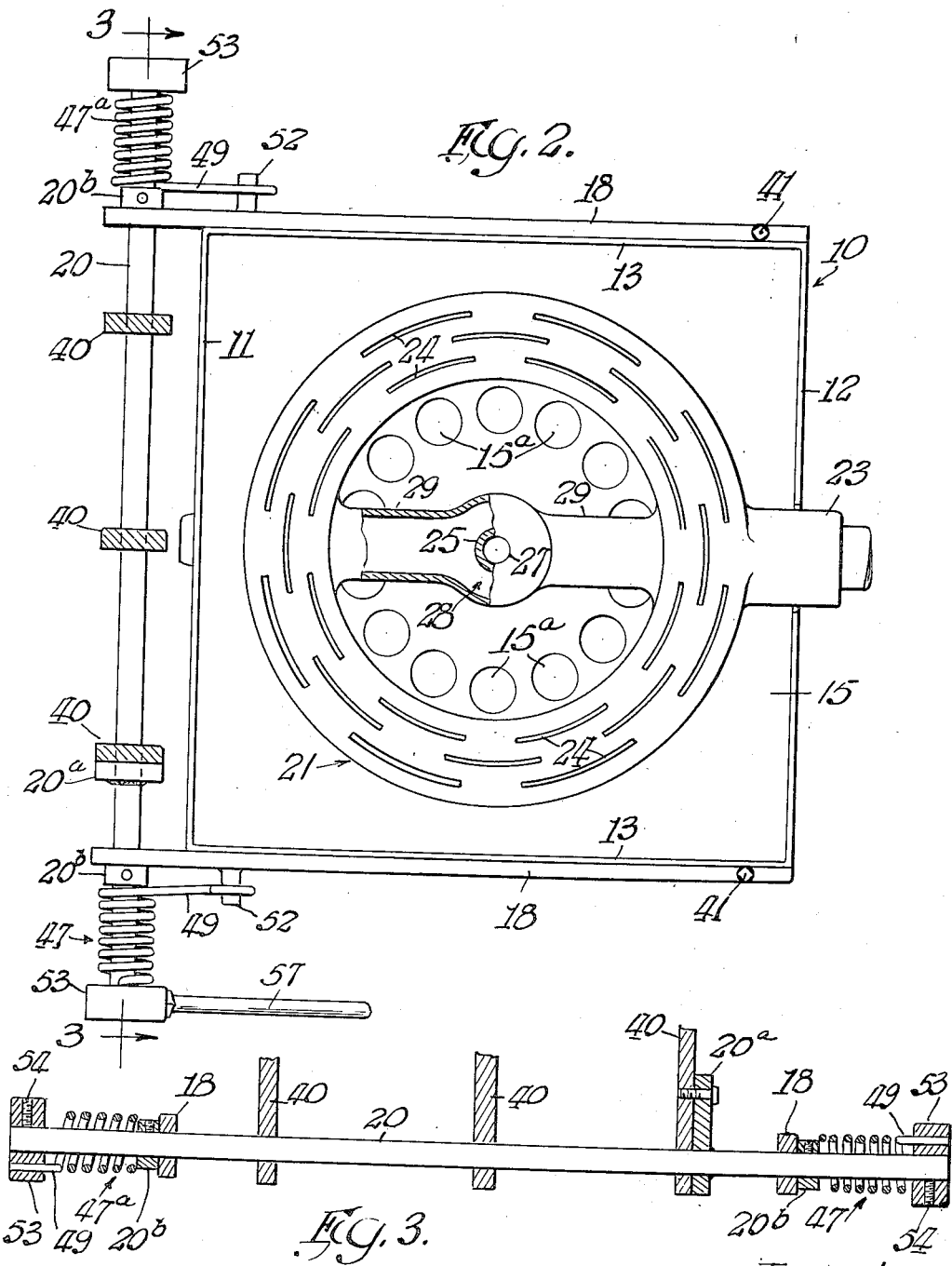

Patented Jan. 9, 1951

2,537,744

UNITED STATES PATENT OFFICE 2,537,744

CORN POPPING APPARATUS

Charles J. Cretors, Highland Park, Ill., assignor to C. Cretors & Co., Chicago, Ill., a corporation of Illinois Application June 10, 1946, Serial No. 675,580

6 Claims. (Cl. 99—238.5)

This invention relates to improvements in corn popping apparatus and it consists of the matters hereinafter described and more particularly pointed out in the appended claims. The invention is more especially concerned with apparatus of the kind used in commercial pop corn establishments, and which includes a popping pan or kettle that is pivoted off center for a swinging tipping movement, about a horizontal axis, from a substantially horizontal popping position to a substantially inverted dumping position. Apparatus of this kind, which is illustrated and described in my prior Patent 2,254,271 of September 2, 1941, is usually attended and operated by women in such establishments and the pan thereof weighs on the order of about 20 pounds. Such a pan is manually tipped to dump the popped corn and is then manually returned to popping position many times during a day's work and requires a physical strain and effort that tires the operator to a point where efficiency is materially reduced.

One of the objects of the present invention is to provide simple and efficient means for substantially counterbalancing the weight of the pan so that when the same is manually tipped from its popping position to its dumping position and swung back to its popping position, the operator is relieved of substantially all physical strain and effort.

Another object of the invention is to provide in apparatus of this kind, a simple and inexpensive spring arrangement which functions to make easy the manual tipping of the kettle or pan from its popping to its dumping position and its return to said popping position, with but little physical strain and effort on the part of the operator.

The above mentioned objects of the invention, as well as others, together with the advantages thereof, will more fully appear as the specification proceeds.

In the drawings:

Fig. 1 is a view in side elevation of a corn popping apparatus illustrating one embodiment of the invention, a portion of the pedestal-like casing being shown in vertical section better to disclose parts within the same, and with the popping pan shown in full lines in its poping position and indicated in dotted lines in its dumping position.

Fig. 2 is a horizontal sectional view, on an enlarged scale through a part of the apparatus, as taken on the line 2—2 of Fig. 1.

Fig. 3 is another horizontal detail sectional view through a part of the apparatus, as taken on the line 3—3 of Fig. 2.

Fig. 4 is a view in side elevation of a certain rockshaft embodied in the improved corn popping apparatus, on a scale greater than that of Fig. 1.

Fig. 5 is a perspecive view of one of a pair of opposing springs embodied in the apparatus on a scale enlarged over that of Fig. 2.

Fig. 6 is a view in end elevation of one of a pair of collars embodied in the apparatus on the scale of Fig. 5 and which will be more fully referred to later.

Referring now in detail to that embodiment of the invention illustrated in the drawing, 10 indicates as a whole the pedestal-like base of the apparatus in the form of an upright hollow rectangular casing embodying therein front and rear walls 11 and 12 and side walls 13—13. At the bottom of the pedestal-like base is a raised bottom wall 14 and toward the top of the base is a horizontal partition 15, which divides the same into a bottom end drive mechanism compartment 10a and a top end burner or heating element compartment 10b. Horizontally elongated holes 16 are formed in the front wall 11 and in the side walls 13—13 above the partition 15, to provide for the lateral inlet of air into the compartment 10b and an annular row of openings 15a is formed in said partition for the bottom inlet of air into said compartment. Only one opening 16, in one of the side walls 13 appears in Fig. 1 and the openings 15a best appear in Fig. 2.

The rear wall 12 is made removable from the other walls of the pedestal and is formed toward its bottom end with an extension housing 17, the purpose of which will appear later. In one of the upright walls of the housing is the bottom air inlet opening 17a (see Fig. 1) for the compartment 10a of the casing 10. A bar 18 is fixed to the top end of each side wall 13 by means of screws 19 and the front end portions of said bars extend forwardly beyond the front wall 11. A rock shaft 20 is journalled in the front end extensions of the bars 18 and said shaft is of such length that it extends at each end outwardly beyond each bar 18.

In the compartment 10b is located a heating element which, in this instance, is shown as a burner 21 for gas or other suitable fuel. Said burner is in the form of a ring provided at certain points about its bottom with feet 22 (see Fig. 1) which engage upon the partition 15. The burner 21, which is of such an inside diameter as to encompass the annular row of openings 15a in the partition 15, is provided with a fuel tube 23 that projects through the rear wall 12 where it is adapted to have a suitable connection with a fuel pipe, not shown. In the top surface of the burner are the usual burner orifices 24. Said burner includes a central boss 25 (see Fig. 2) having a vertical passageway 27 and an annular channel 28, which is connected by ducts 29 to opposite sides of the burner in line with the fuel tube 23. By reason of the arrangement of the openings 16, 17a and 15a, respectively, air to support combustion at the annular burner 21 is provided at the outside and at the inside thereof so that an even burning of fuel is assured at all of the burner orifices 24.

The vertical passageway 27 is located centrally of the pedestal-like base and journalled in and extending through the partition 15 is an upright shaft 30. The top end of said shaft extends t an elevation above the plane of the top edge of the bars 18 and said shaft end carries a cross pin 31. The bottom end of said shaft extends into and is operatively connected to a speed reducing mechanism 32 at the bottom of the pedestal-like base. This mechanism is driven by a motor 33, a part of which is located in the housing 17, before mentioned. It is to be noted from Fig. 1 that air entering the chamber 10a through the opening 17a, passes about and over the motor 33 so as to keep the same in a relatively cool condition.

35 indicates as a whole the popping pan or kettle of the apparatus, which is located in spaced relation above the open top end of the pedestal-like base 10. Said pan is a circular one of a diameter greater than the greatest horizontal dimension of the top of the base and its axis is arranged coaxially with that of the shaft 30 when said pan is in its normal horizontal popping position, as shown in full lines in Fig. 1. It includes an annular relatively thin sheet metal side wall 36 and a relatively thick bottom 37. As shown, the side wall flares upwardly and outwardly from the bottom and has a top end marginal bead 38.

Toward the front portion of said bottom 37 is a plurality of laterally spaced depending arms 40 through which the rockshaft 20, before mentioned, extends and one of said arms is fixed in any suitable manner to an upright arm 20a (see Fig. 4) welded to said shaft. Toward the rear end of each bar 18 is an upright adjustable post 41. Said posts form stops for engagement by the bottom 37 of the pan to dispose the same in popping position in a horizontal plane.

A stub shaft 42 is journalled axially in the bottom 37 and carries an agitator (not shown) disposed substantially in wiping engagement with the upper surface of said bottom. The stub shaft 42 carries a bifurcated coupling 43, adapted to detachably engage the top end of the shaft 30. When the pan is in its horizontal popping position, with its coupling engaged with the top end of said shaft 30, the pin 31 thereon engages in the bifurcation of the coupling to provide an operative but detachable driving connection between said shaft and the stub shaft 42, to which the agitator, before mentioned, is attached.

The front portion of the side wall of the kettle or pan is shorter in height than the remaining portion of said side wall and both portions are provided with hinged cover sections 44 and 45, respectively. The cover section 44 is provided with a counterweight 46 which swings the same into the open position when the pan has been tipped or swung about the axis of the shaft 20 into the dumping position, indicated in dotted lines in Fig. 1.

The description of said cover sections for said pan 35 appears in more detail in my before mentioned patent.

In commercial corn popping establishments, where volume is sought, the pan is tipped from one position to the other and back again many times in the work day of the operator, usually a woman. To make the work of tipping the pan between the positions mentioned easier and lighter for the operator, I provide means which counterbalance the weight of the pan when swung in both directions, that is from the popping position to the dumping position and back to popping position.

The preferred forms of such means is a pair of opposing torsion springs 47—47a, which are each operatively connected at one end to the shaft 20 and are each operatively connected at the other end to an associated bar 18. One of these springs is shown in perspective in Fig. 5 and is indicated as a whole by the numeral 47, and is indicated as a whole by the numeral 47. Each spring includes a helical wound body 48 of suitable wire and at one end is formed with a laterally extending arm 49 that terminates in an eye 50. At the other end of said body is a longitudinally extending arm 51.

The springs 47—47a are substantially alike in structure, but obtain their opposing effect in the manner in which they are disposed in their operative positions. Each spring is mounted to surround an associated part of the shaft 20 outwardly from each bar 18. In arranging the spring 47 in place, it is slipped onto its shaft portion from its extremity with the arm 49 facing its associated bar and with the arm 51 leading off from the top of the body 48. The eye 50 is engaged over a stud 52 projecting laterally from the associated bar 18. When the spring 47a is to be assembled in place, it is turned end for end and this causes the arms 49 and 51 thereof to lead off from the bottom of the coil body. The spring 47a is then slipped onto its associated shaft end, with its arm 49 facing the associated bar 18 and the eye 50 is then engaged with a similar stud 52 on said bar 18.

Before the springs are applied to the shaft end portions, there is applied and fixed to each shaft end portion a collar 20b which engages the outer face of the associated bar and holds the shaft 20 against longitudinal shifting.

After the springs 47—47a have been applied to said shaft end portions, a collar 53 of a diameter greater than that of said springs is applied to each shaft end portion and is locked thereto by a set screw 54 (see Fig. 3). Each collar 53 is provided with a plurality of longitudinal holes 55 (see Fig. 6) any one of which will receive the longitudinal extension 51 of the associated spring 47—47a to lock the associated end of the spring to the shaft. The torsion action of the spring may be adjusted by causing the spring extension 51 to engage in the desired collar opening 55.

Each collar 53 is also provided with a radial threaded hole 56 (see Fig. 6) to removably receive one end of a lever 57 (see Fig. 1) and by means of which the operator may swing the pan from one position to the other, as before mentioned. The lever may be applied to either collar 53, so that the operator may work either left handed or right handed in tipping the pan from one position to the other.

When the pan 35 is in its popping position, shown in full lines in Fig. 1, the spring 47a is in torsion and the spring 47 is out of torsion. Thus, when the operator grasps the lever 57, to tip the pan, the torsion in the spring 47 releases and assists in swinging the pan toward its dumping position. Thus, in the swinging of the pan into the dumping position, shown in dotted lines in Fig. 1, the spring 47 becomes untorsioned and the spring 47a becomes torsioned. To return the pan to popping position, the operator swings the lever 57 in the other direction, wherein the torsion in the spring 47 functions to assist in this movement. While one spring is under torsion, the other is out of torsion in the movement of the pan from one position to the other and a reversal of the torsion condition of the springs is produced. Thus, said springs are so arranged as to be alternately torsioned and untorsioned in the swinging movement of the pan from either of its positions to the other one thereof.

The springs 47—47a substantially counterbalance the weight of the pan in its swinging movement from one position to the other, so that but slight physical effort is required on the part of the operator.

While in describing the invention I have referred in detail to the form, construction and arrangement of the parts involved, the same is to be considered only in the illustrative sense so that I do not wish to be limited thereto except as may be specifically set forth in the appended claims.

I claim as my invention:

1. In a corn popping apparatus, a popping pan, supporting means below said pan, means pivotally mounted said pan off-center upon said supporting means for a manual swingable movement from a substantially horizontal popping position to a substantially inverted dumping position, spring means disposed between the supporting means and said pan, a part of said spring means, when said pan is in popping position, normally tending to swing the pan toward its dumping position, and another part of said spring means, when said pan is in dumping position, normally tending to swing said pan back to said popping position.

2. In a corn popping apparatus, a popping pan, supporting means below said pan, means pivotally mounting said pan off-center upon said supporting means for a manual swingable movement from a substantially horizontal popping position to a substantially inverted dumping position, a plurality of springs operatively connected to said supporting means and said pan respectively, said springs being so relatively arranged as to be alternately torsioned and untorsioned in the swinging movement of the pan from either of its positions to the other thereof.

3. In a corn popping apparatus, a popping pan, supporting means below said pan, a rockshaft journalled in said supporting means, means operatively securing said pan in a plane spaced from its center to said rockshaft and whereby said pan may be manually swung about the axis of said shaft from a substantially horizontal popping position to a substantially inverted dumping position, a plurality of spring means each fixed at one end to the shaft and fixed at the other end to said supporting means, said spring means being so relatively arranged as to be alternately torsioned and untorsioned in the swinging movement of the pan from either of its positions to the other thereof.

4. In a corn popping apparatus, a popping pan, supporting means below said pan, a rockshaft journalled in said supporting means, means operatively securing said pan in a plane spaced from its center to said rockshaft and whereby said pan may be manually swung about the axis of said shaft from a substantially horizontal popping position to a substantially inverted dumping position, a pair of opposing springs engaged on said shaft and each operatively secured at one end to said shaft and each operatively secured at its other end to said supporting means, one of said springs being in torsion and the other out of torsion when the pan is in popping position, said one of said springs being untorsioned and the other of said springs being torsioned when said pan is swung from popping position to dumping position.

5. In a corn popping apparatus, a popping pan, supporting means below said pan, a rockshaft journalled in said supporting means, means operatively securing said pan in a plane spaced from its center to said rockshaft and whereby said pan may be manually swung about the axis of said shaft from a substantially horizontal popping position to a substantially inverted dumping position, a pair of opposing springs engaged on said shaft and operatively fixed at one end to said supporting means, and a collar associated with each spring and mounted on said shaft, each said collar being provided with a plurality of spaced means, each adapted to retain the other end of the associated spring, whereby the torsion of the spring may be adjusted.

6. In a corn popping apparatus, a popping pan, supporting means below said pan, a rockshaft journalled in said supporting means, means operatively securing said pan in a plane spaced from its center to said rockshaft and whereby said pan may be manually swung about the axis of said shaft from a substantially horizontal popping position to a substantially inverted dumping position, a pair of opposing springs engaged on said shaft and operatively fixed at one end to said supporting means, and a collar associated with each spring and mounted on said shaft, each said collar being provided with a plurality of spaced openings, each opening adapted to receive the other end of the associated spring whereby the torsion of the spring may be adjusted.

CHARLES J. CRETORS.

REFERENCES CITED

The following references are of record in the file of this patent:

UNITED STATES PATENTS

| Number | Name | Date |
| --- | --- | --- |
| 975,507 | Bundy | Nov. 15, 1910 |
| 1,478,819 | Cretors | Dec. 25, 1923 |
| 2,254,271 | Cretors | Sept. 2, 1941 |